Figure 1:
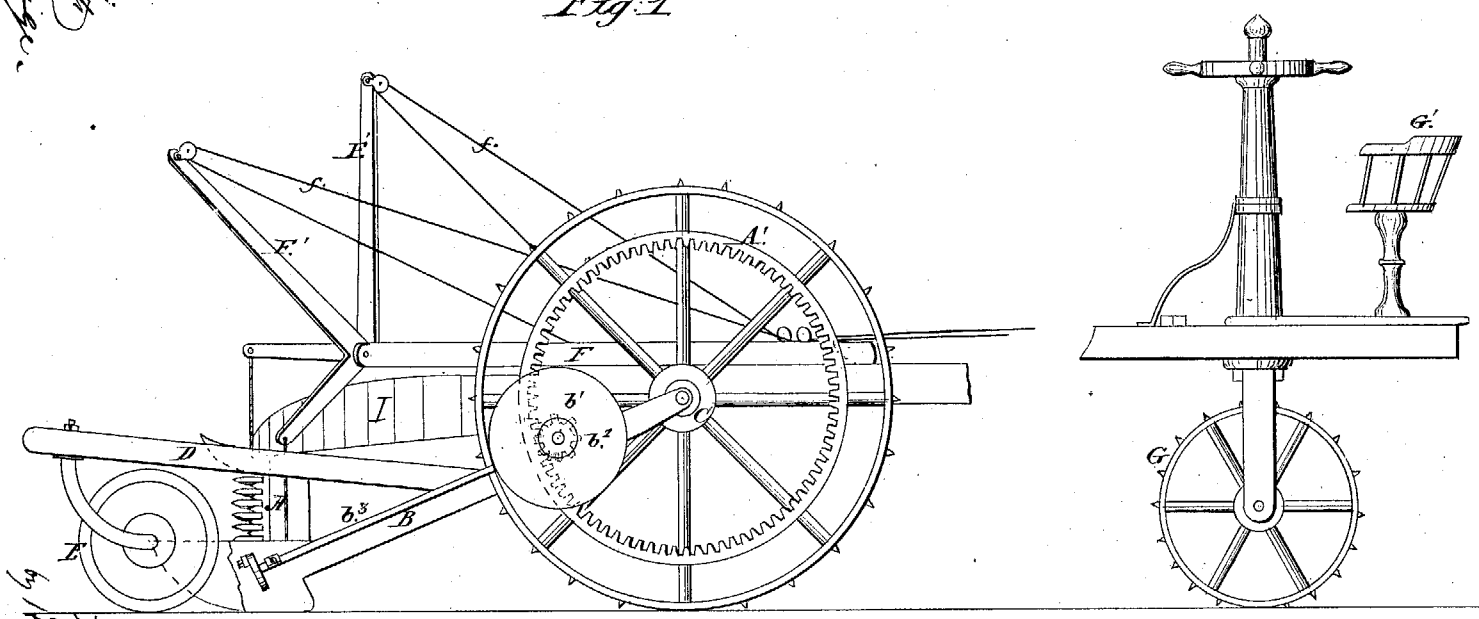

2 Sheets--Sheet 1.

L. B. STILSON.
Harvester.

No. 6,524. Reissued June 29, 1875.

Witnesses:
Henry Orth
A. B. Paige.

Inventor:
Lyman B. Stilson
by H H Doubleday
atty.

THE NORRIS PETERS CO., PHOTO-LITHO., WASHINGTON, D. C.

2 Sheets--Sheet 2
L. B. STILSON.
Harvester.
No. 6,524. Reissued June 29, 1875.
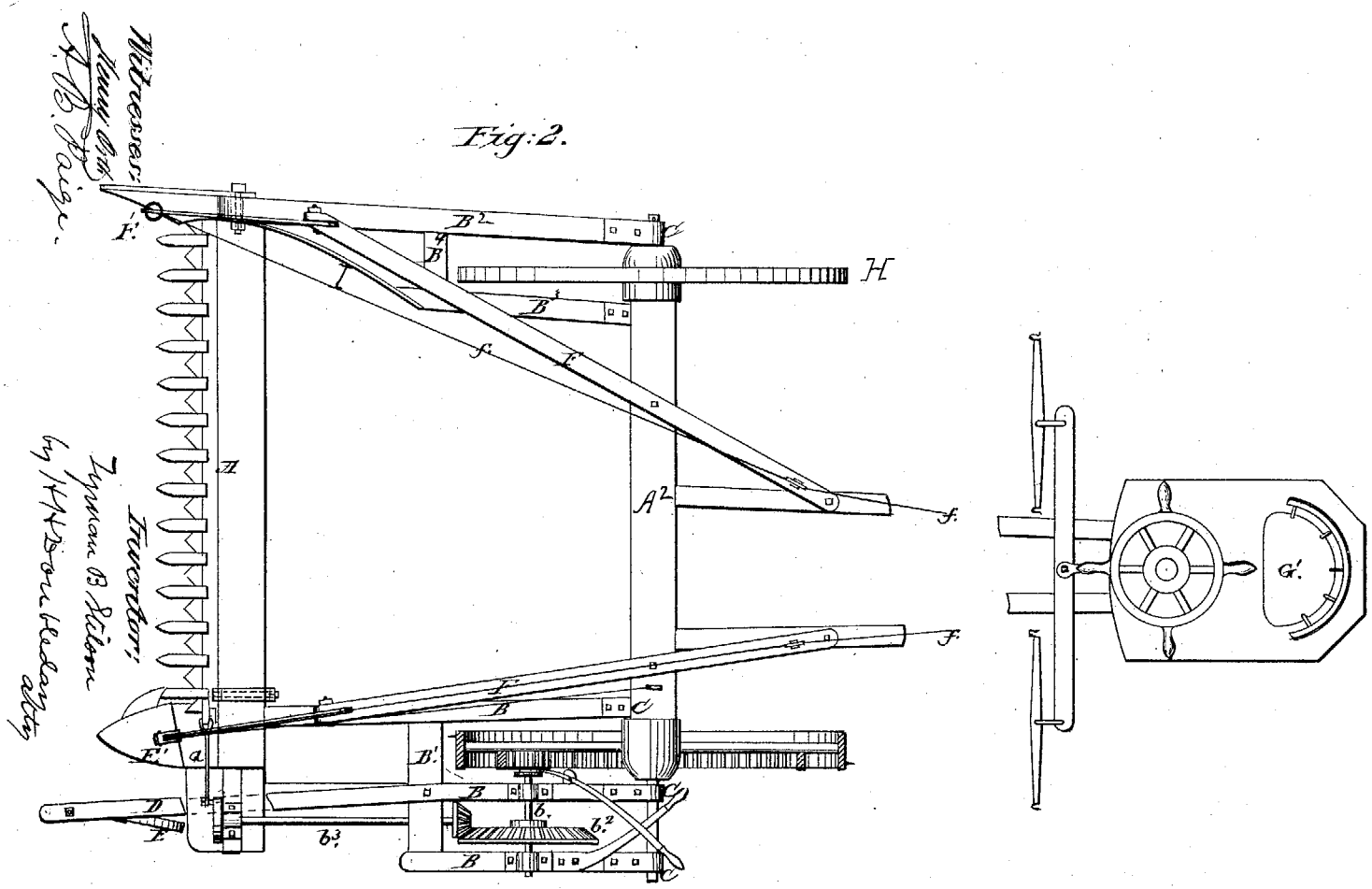
THE NORRIS PETERS CO., PHOTO-LITHO., WASHINGTON, D. C.

UNITED STATES PATENT OFFICE.

LYMAN B. STILSON, OF MINNEAPOLIS, MINNESOTA, ASSIGNOR TO HIMSELF AND AUGUST LEICH.

IMPROVEMENT IN HARVESTERS.

Specification forming part of Letters Patent No. 82,890, dated October 6, 1868; reissue No. 6,524, dated June 29, 1875; application filed April 1, 1875.

*To all whom it may concern:*

Be it known that I, LYMAN B. STILSON, formerly of Woodland, in the county of Wright and State of Minnesota, but now of Minneapolis, in the county of Hennepin, in said State of Minnesota, have invented a new and useful Improvement in Mowing-Machines, which improvement is fully set forth in the following specification, reference being had to the accompanying drawings.

Figure 1 is a side elevation, and Fig. 2 is a top or plan view.

The invention relates to that class of mowers in which the cutting apparatus is arranged directly in front of the main driving and supporting wheels, and cuts the grass from that portion of the ground which is traversed by the team as they propel the machine on each "bout" across or around the field; and the invention relates to a novel method of supporting the finger-bar, whereby each end of the cutting apparatus is free to rise and fall independently to conform to the irregularities in the surface of the ground over which the machine is moving.

In the drawings, A is the finger-bar. B B B are arms or bars, connected by means of a cross-girt, $B^1$, and a shoe-piece, thus forming a gear-frame, upon which the secondary shaft $b$, the bevel-wheel $b^2$, and the crank-shaft $b^3$ are mounted. This gear-frame is hinged upon and vibrates about the main axle. Thus the frame may oscillate upon the axle without disturbing the relation between the pinion $b^1$ on the secondary shaft and the internally-toothed rim $A^1$ on one of the main wheels, with which it meshes. One end of the finger-bar A is hinged to the front end of this gear-frame, and is propelled over the ground thereby. $B^2$ is a thrust-arm, hinged to the main axle, the forward end of this arm being connected with the opposite end of the cutter-bar A by means of a flexible joint, which permits this end of the bar to rise and fall freely without lifting that end which is attached to the gear-frame. $B^3$ is a bar, also hinged to the main axle, and connected with bar $B^2$ by a short girt, $B^4$. I is a scraper or track-clearer, attached to bars or arms $B^2$ $B^3$, to convey the cut grass inward from the path of that supporting-wheel which is in rear of this clearer.

The front end of the gear-frame is mounted on caster-wheel E and arm D. F F are bars attached to the pole and to the cross-girt $A^2$, which rests upon the main axle. F′ F′ are lifting-levers pivoted to these arms. $f$ $f$ are cords, by means of which the operator can at will raise the cutting apparatus, as will be readily understood without further explanation. G is a steering-wheel at the rear end of the pole, which extends rearward from the center of the main axle. By the use of this wheel the driver can, while riding in his seat G′, guide the machine. The lateral motion is imparted to the cutter-bar through crank-shaft $b^3$ and pitman $a$.

It is apparent that either end of the cutting apparatus is free to rise and fall independently of the other end, as the undulations of the surface may render necessary.

What I claim is—

A gear-frame vibrating about the main axle, and having one end of the finger-bar hinged thereto and propelled over the ground thereby, in combination with an independently-vibrating thrust-arm, connected to and carrying forward the other end of the finger-bar, whereby each end of the cutting apparatus, which is arranged in front of the main carrying-wheels, and cuts the grass between said wheels, is free to rise and fall independently, substantially as set forth.

LYMAN B. STILSON.

Witnesses:

F. P. LANE,

H. H. DOUBLEDAY.